United States Patent [19]
Tamaru et al.

[11] Patent Number: 6,133,165
[45] Date of Patent: *Oct. 17, 2000

[54] BULKY POLYTETRAFLUOROETHYLENE FILAMENT AND SPLIT YARN, METHOD OF PRODUCTING THEREOF, METHOD OF PRODUCING COTTON-LIKE MATERIALS BY USING SAID FILAMENT OR SPLIT YARN AND FILTER CLOTH FOR DUST COLLECTION

[75] Inventors: Shinji Tamaru; Katsutoshi Yamamoto; Jun Asano, all of Settsu, Japan

[73] Assignee: Daikin Industries, Ltd., Osaka, Japan

[*] Notice: This patent is subject to a terminal disclaimer.

[21] Appl. No.: 08/765,336

[22] PCT Filed: Jun. 26, 1995

[86] PCT No.: PCT/JP95/01275

§ 371 Date: Dec. 23, 1996

§ 102(e) Date: Dec. 23, 1996

[87] PCT Pub. No.: WO96/00807

PCT Pub. Date: Jan. 11, 1996

[30] Foreign Application Priority Data

Jun. 30, 1994 [JP] Japan ..................................... 6-173426

[51] Int. Cl.$^7$ .............................. D02G 3/00; B32B 27/00
[52] U.S. Cl. .............................. 442/59; 442/60; 428/364; 428/397; 428/422; 264/145; 264/146; 264/147; 264/160
[58] Field of Search ..................................... 428/364, 397, 428/398, 399, 131, 315.5, 315.7, 422; 264/127, 147, 160, 113, 119, 122, 288.8, 177.17, 210.7, 145, 146; 526/252, 255; 528/272, 288, 296, 302, 307, 350, 353; 442/59, 60

[56] References Cited

U.S. PATENT DOCUMENTS

| | | | |
|---|---|---|---|
| 5,064,593 | 11/1991 | Tamaru et al. | 264/113 |
| 5,171,805 | 12/1992 | Tatemoto et al. | 526/252 |
| 5,234,739 | 8/1993 | Tanaru et al. | 428/131 |
| 5,348,700 | 9/1994 | Nakamura et al. | 264/177.17 |
| 5,562,986 | 10/1996 | Yamamoto et al. | 428/364 |

FOREIGN PATENT DOCUMENTS

| | | |
|---|---|---|
| 59-116462 | 7/1984 | Japan . |
| 2-286220 | 11/1990 | Japan . |
| 5-068821 | 3/1993 | Japan . |
| 1531720 | of 1978 | United Kingdom . |

OTHER PUBLICATIONS

International Search Report in PCT/JP95/01275 mailed Sep. 19, 1995.

*Primary Examiner*—Louise N. Leary
*Attorney, Agent, or Firm*—Varndell & Varndell, PLLC

[57] ABSTRACT

The split PTFE yarn and PTFE filament which are bulky and excellent in the feeling and have good intermingling property can be obtained and the cotton-like PTFE materials can be produced therefrom efficiently at a low percentage of dropped fibers. Further the filter cloth for dust collection which is obtained from those cotton-like materials has a high collection efficiency. The present invention can provide the split yarn having a network structure and obtained by splitting a uniaxially stretched PTFE film in the stretched direction with a needle blade roll; the filament having branches and obtained by cutting the network structure of the split yarn in a longitudinal direction; the methods of production thereof; the method of producing the cotton-like materials by cutting the split yarn or filament and then opening; and a filter cloth for dust collection obtained from the cotton-like materials.

21 Claims, 12 Drawing Sheets

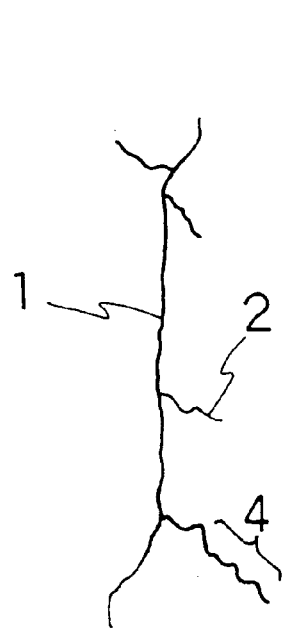
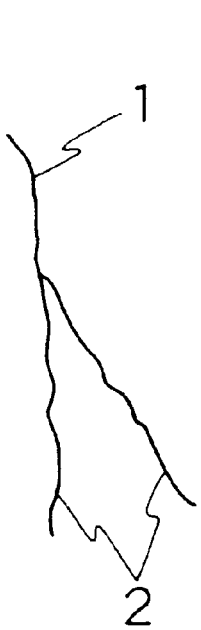
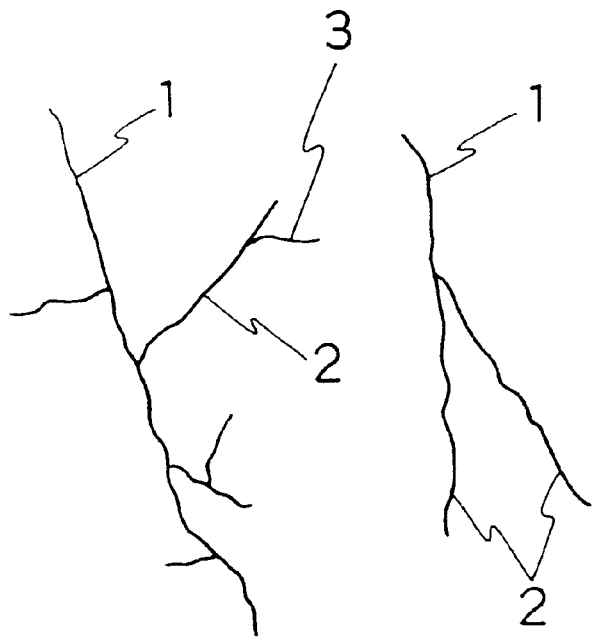
FIG. 6(a)  FIG. 6(b)  FIG. 6(c)
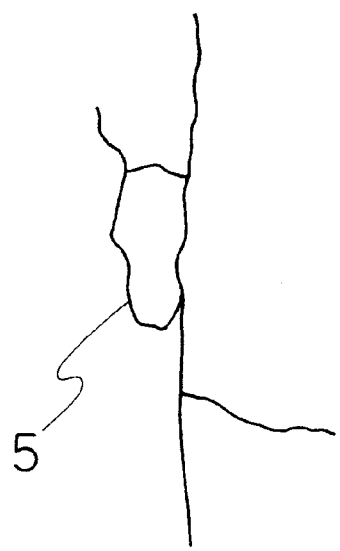
FIG. 6(d)

BULKY POLYTETRAFLUOROETHYLENE FILAMENT AND SPLIT YARN, METHOD OF PRODUCTING THEREOF, METHOD OF PRODUCING COTTON-LIKE MATERIALS BY USING SAID FILAMENT OR SPLIT YARN AND FILTER CLOTH FOR DUST COLLECTION

TECHNICAL FIELD

The present invention relates to a bulky split yarn and filament of polytetrafluoroethylene (PTFE), a method of producing cotton-like materials comprising the above-mentioned split yarn and filament and a filter cloth for dust collection.

BACKGROUND ART

In recent years, non-woven fabrics comprising synthetic fibers, by making the best use of characteristics of those fibers, are extending their applications into various fields, such as clothing materials, medical materials, engineering and building materials, and materials for industrial use.

Among them, non-woven fabrics containing PTFE fibers are excellent in heat resistance, chemical resistance and abrasion resistance, and are expected to be further developed as highly functional non-woven fabrics.

Cotton-like PTFE materials being made into the non-woven fabrics are gathered PTFE fibers, and so far have been made in such manners as mentioned below:

(1) A process for producing filaments and then cutting to a desired length.

The process for producing PTFE filaments is roughly classified into the following two processes.

(1a) An emulsion spinning method disclosed in U.S. Pat. No. 2,772,444.

This method comprises extrusion spinning of a viscose binder, and the like containing PTFE particles, and then sintering to obtain the filaments having a uniform figure, the section of which is defined by a shape of nozzles. Major problems of that method are such that a binder remains as a carbonaceous residual after sintering, the obtained PTFE filaments are colored in a dark brown, and even if the carbonaceous residual is oxidized to be discolored, an original purity cannot be maintained. The method has also a drawback that since a complicated step is employed, cost is high.

(1b) A method disclosed in JP-B-22915/1961 or JP-B-8769/1973. This method comprises stretching of fibers obtained by slitting a PTFE film to a desired width. A problem of this method is that when the slit width is made narrower, the finer the obtained fiber is, the more easily the fibers are broken at the time of stretching.

Both PTFE fibers obtained by the methods (1a) and (1b) have a low friction coefficient and a high specific gravity inherent to the PTFE, and therefore are not intermingled sufficiently with each other even if having been crimped. (JP-B-22621/1975)

(2) A process for preparing PTFE fibrous powder in the form of a pulp and making a sheet-like material therefrom by paper making process (U.S. Pat. No. 3,003,912 and JP-B-15906/1969).

The method of the above-mentioned U.S. patent is to cut PTFE rod, cord or filament obtained by a paste extrusion, to a short length and to apply a shearing force to obtain PTFE fibers.

JP-B-15906/1969 discloses a method for making fibers by applying a shearing force to the PTFE powder.

Any of the fibrous powder obtained by the above-mentioned methods can be made up to a sheet-like material by paper making process but cannot be made into a non-woven fabric by the use of a carding machine, needle punching machine, or the like as they are short in fiber length and in the form of a pulp.

In order to eliminate those drawbacks of the PTFE fibers, the present inventors have developed a method of producing PTFE staple fibers (relatively short fibers) and cotton-like PTFE materials directly by tearing to open a uniaxially stretched PTFE film with mechanical force and filed the patent application (JP-A-78264/1993). The PTFE staple fibers obtained by that method are bulky and contain fibers having good intermingling property but also contain a lot of short fibers which do not contribute to enhancement of intermingling property. Those short fibers drop in a carding step for producing non-woven fabrics, and thus yield is not good.

An object of the present invention is to provide a method of producing cotton-like PTFE materials containing PTFE fibers having excellent intermingling property.

Another object of the present invention is to provide PTFE split yarns having a network structure, which are usable for producing the cotton-like PTFE materials, and a method of producing the PTFE split yarns.

Yet another object of the present invention is to provide a PTFE filament usable for producing the cotton-like PTFE materials and a method of producing the PTFE filaments.

Yet another object of the present invention is to provide a filter cloth for dust collection which can be obtained from the cotton-like materials produced by the above-mentioned method of producing the cotton-like PTFE materials.

DISCLOSURE OF THE INVENTION

The present invention relates to a method of producing split yarns having a network structure by splitting a uniaxially stretched PTFE film in the stretched direction with needle blade rolls, and to the PTFE split yarns obtained thereby.

The present invention also relates to a method of producing PTFE filaments having branches by cutting the network structure of the split yarns in the longitudinal direction, and to the PTFE filaments obtained thereby.

The present invention further relates to a method of producing cotton-like PTFE materials by cutting the PTFE split yarns or PTFE filaments to a given length and then opening.

The present invention further relates to a filter cloth for dust collection obtained from the cotton-like PTFE materials by the method of production thereof.

BRIEF DESCRIPTION OF THE DRAWINGS

FIGS. 6(a) to 6(d) are diagrammatic views showing a branched structure of the PTFE fibers being contained in the cotton-like PTFE materials of the present invention.

PREFERRED EMBODIMENTS OF THE INVENTION

Figure 1:
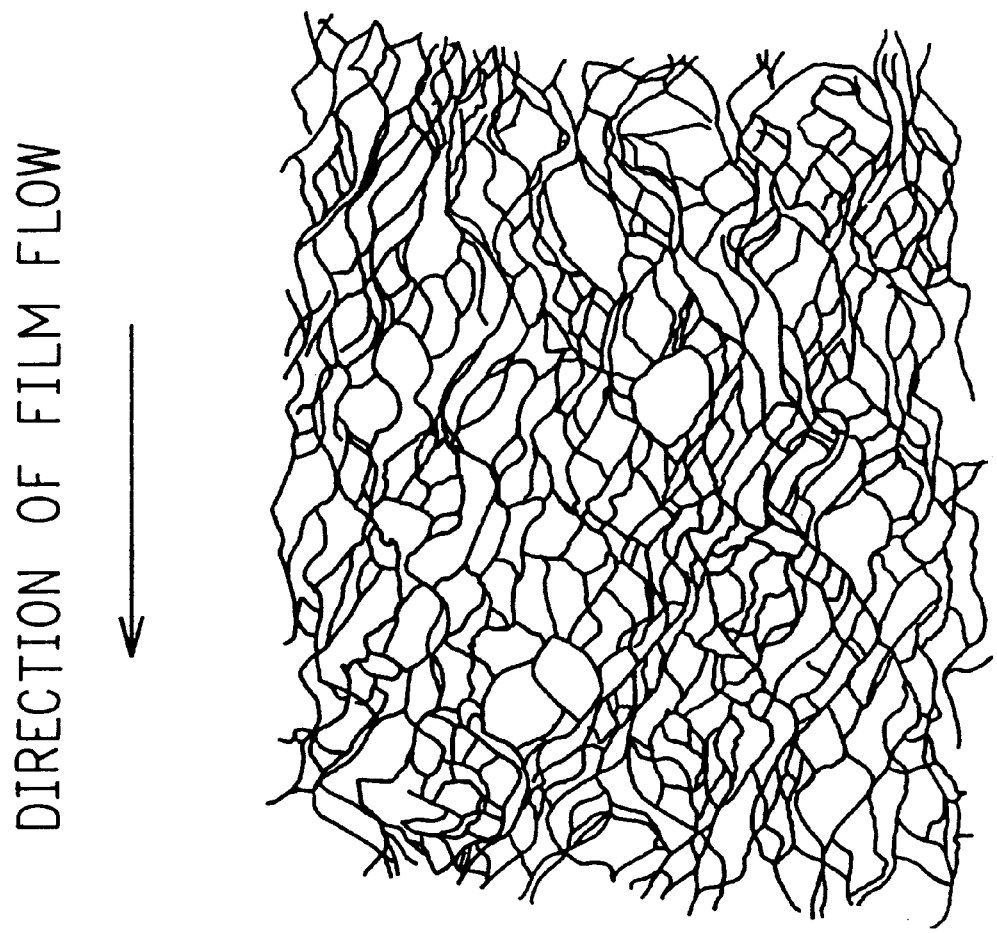
FIG. 1 is a diagrammatic view showing a state of a split yarn of the present invention being enlarged.

The major feature of the present invention is to once split a uniaxially stretched article of a PTFE film (hereinafter referred to as "uniaxially stretched PTFE film") without tearing directly into staple fibers. In the present invention, a needle blade roll, preferably a pair of needle blade rolls are used as means for obtaining a network structure by splitting the uniaxially stretched PTFE film in the stretched direction. The above-mentioned network structure is such that the uniaxially stretched PTFE film is not split into separate fibers and when spread in the transverse direction (a direction at a right angle to the film feeding direction) of the film after splitting, the film becomes net-like as shown in FIG. 1. In order to obtain such a network structure, the relation of the feed speed of the uniaxially stretched PTFE film and the rotation speed of the needle blade rolls, and the arrangement and the number of needles of the needle blade rolls may be properly selected.

The split yarn of the present invention is a uniaxially stretched PTFE film having a network structure as it is or is obtained in the form of a cord by bundling the uniaxially stretched PTFE films having a network structure.

Each embodiment of the present invention is explained hereinbelow. Techniques explained hereinafter are those common to all embodiments unless particularly noted.

As the PTFE film used in the present invention, there are, for example, those obtained with a paste extrusion molding of PTFE fine powder (PTFE fine powder obtained by an emulsion polymerization) or those obtained with a compression molding of PTFE molding powder (PTFE powder obtained by a suspension polymerization). In the present invention, the film includes those in such a form as tape, sheet and ribbon in addition to film. A thickness thereof is 5 to 300 μm, preferably 5 to 150 μm in order to conduct a stable stretching. A PTFE film can be obtained by calendering the extrudate molded by paste extrusion of PTFE fine powder or cutting a compression-molded PTFE powder.

The PTFE film to be uniaxially stretched is preferably semi-sintered or sintered one. The semi-sintered PTFE is obtained by heat-treating the unsintered PTFE at a temperature between the melting point (about 327° C.) of the sintered PTFE and the melting point (about 337° C. to about 347° C.) of the unsintered PTFE. A crystalline conversion ratio of the semi-sintered PTFE is usually 0.10 to 0.85, preferably 0.15 to 0.70.

The crystalline conversion ratio of the semi-sintered PTFE article is determined as follows:

10.0±0.1 mg of a sample of the semi-sintered PTFE is prepared. Since the sintering proceeds from the surface toward the inner portion, the degree of the semi-sintering of the article is not necessarily homogeneous throughout the article, and the semi-sintering is less homogeneous in a thicker article than in a thinner one. In the preparation of the sample, it is, therefore, to be noted that various portions having various degrees of semi-sintering must be sampled uniformly. With thus prepared sample, at first the crystalline melting curve is made in the following method.

The crystalline melting curve is recorded by means of a DSC (Model DSC-2 of Perkin-Elmer). First the sample of the unsintered PTFE is charged in an aluminum-made pan of the DSC, and the heat of fusion of the unsintered PTFE and that of the sintered PTFE are measured as follows:

(1) The sample is heated to 277° C. at a heating rate of 160° C./min and then from 277° C. to 360° C. at a heating rate of 10° C./min.

Figure 2:
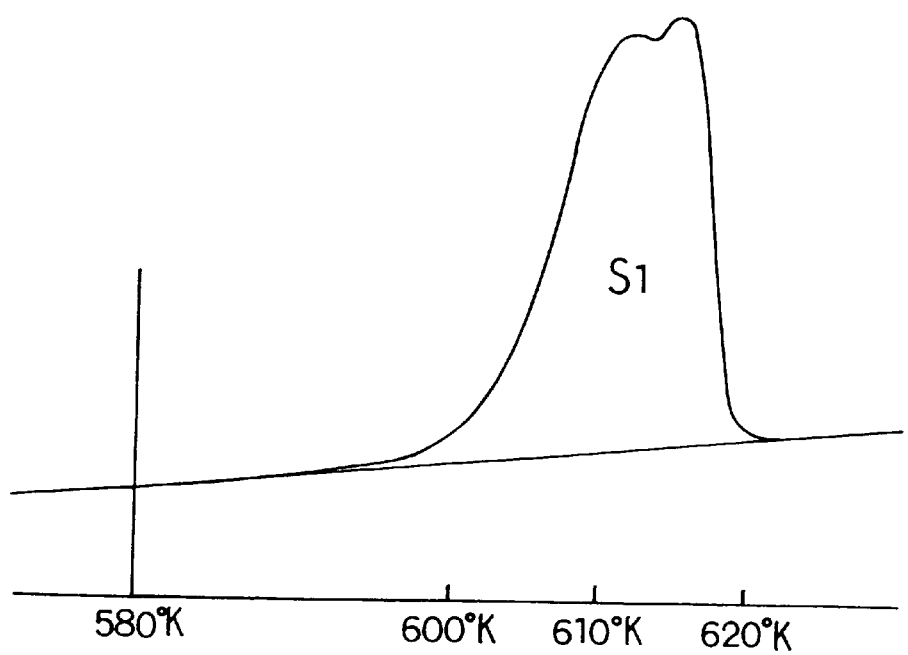
FIG. 2 is an example of a crystalline melting curve obtained from a differential scanning calorimeter in a heating process (1) of an unsintered PTFE, which is used for measuring a crystalline conversion ratio of a semi-sintered PTFE.

An example of a crystalline melting curve recorded during this heating step is shown in FIG. 2. A temperature at the highest peak of an endothermic curve appearing in this step is defined as "a melting point of the unsintered PTFE or PTFE fine powder".

(2) Immediately after heating to 360° C., the sample is cooled to 277° C. at a cooling rate of 80° C./min, and (3) Again the sample is heated to 360° C. at a heating rate of 10° C./min.

Figure 3:
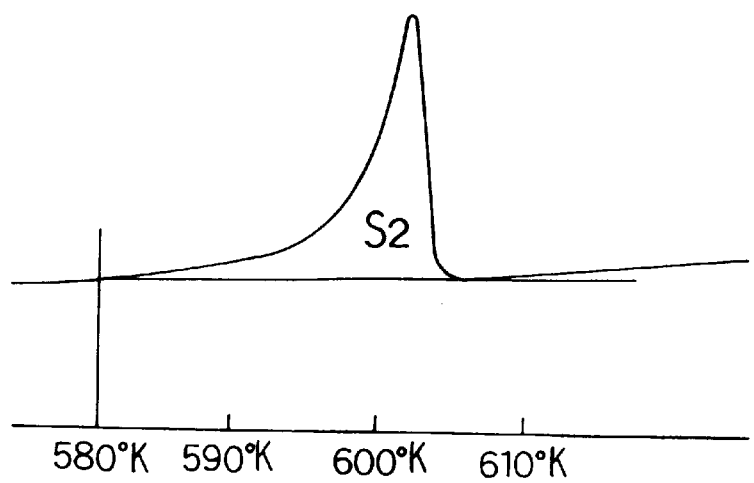
FIG. 3 is an example of a crystalline melting curve of the DSC in a heating process (3) of a sintered PTFE, which is used for measuring a crystalline conversion ratio of a semi-sintered PTFE.

An example of a crystalline melting curve recorded during the heating step (3) is shown in FIG. 3. A temperature at a peak of an endothermic curve appearing in the heating step (3) is defined as "a melting point of the sintered PTFE".

The heat of fusion of the unsintered or sintered PTFE is proportional to the area between the endothermic curve and a base line which is drawn from a point on the DSC chart at 307° C. (580° K) and tangential with the curve at the right-hand foot of the endothermic curve.

Figure 4:
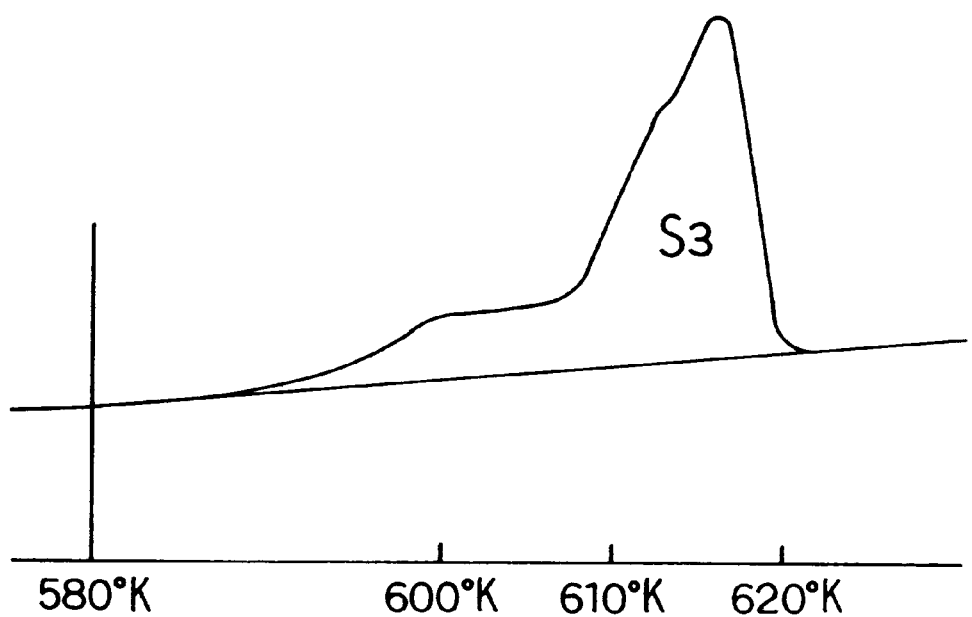
FIG. 4 is an example of a crystalline melting curve of the DSC in a heating process of a semi-sintered PTFE, which is used for measuring a crystalline conversion ratio of a semi-sintered PTFE.

Secondly, a crystalline melting curve for the semi-sintered PTFE is recorded following the step (1), and an example of that curve is shown in FIG. 4.

Then, the crystalline conversion ratio is defined by the following equation:

$$\text{Crystalline conversion ratio}=(S_1-S_3)/(S_1-S_2)$$

wherein $S_1$ is the area of the endothermic curve of the unsintered PTFE (cf. FIG. 2), $S_2$ is the area of the endothermic curve of the sintered PTFE (cf. FIG. 3) and $S_3$ is the area of the endothermic curve of the semi-sintered PTFE (cf. FIG. 4).

The crystalline conversion ratio of the semi-sintered PTFE article of the invention is usually from 0.10 to 0.85, preferably from 0.15 to 0.70.

The sintered PTFE can be obtained by heat-treating the unsintered PTFE or semi-sintered PTFE at a temperature of not less than the melting point of the unsintered PTFE.

The uniaxial stretching of the present invention can be carried out by the conventional methods such as stretching between the two rolls which have been heated to usually about 250° to 320° C. and have different rotation speeds. The stretching ratio is preferably changed depending on the degree of sintering, and is at least 6 times, preferably not less than 10 times in case of the semi-sintered PTFE, and at least 3 times, preferably not less than 3.5 times in case of the sintered PTFE. This is because the orientation is necessary to be increased by stretching since the tearing property of the semi-sintered PTFE in the longitudinal direction is worse as compared with that of the sintered PTFE. Also in order to obtain fine fibers, it is desirable to stretch at as high ratio as possible, but the attainable stretching ratio is usually about 10 times in case of the sintered PTFE, and about 30 times in case of the semi-sintered PTFE.

In case of a too low stretching ratio, there occurs a trouble that the stretched PTFE film is entangled in the needle blades of the needle blade rolls for the splitting.

It is preferable that a thickness of the uniaxially stretched PTFE film after the uniaxial stretching is from 1 to 100 μm, particularly 1 to 50 μm. When larger than 100 μm, split yarns obtained after the splitting, filaments and cotton-like materials become in the rigid state, and the feeling of products obtained therefrom becomes worse. The uniaxially stretched PTFE films having a thickness of less than 1 μm are difficult to produce industrially.

In case of the semi-sintered PTFE and the sintered PTFE, an additional heat treating after the uniaxial stretching can prevent the shrinkage, due to a heat, of the split yarn and fiber obtained after splitting, maintain bulkiness, and particularly in case of the cotton-like materials, prevent lowering of permeability. The heat treating temperature is not less than the temperature at the time of uniaxial stretching, that is, usually not less than 300° C. The heat treating temperature can be selected from the range up to about 380° C., if necessary.

The so-obtained PTFE film uniaxially stretched is split in the stretched direction with the needle blade rolls to be a net-like form.

There are, for example, the following means for splitting.

The uniaxially stretched PTFE film is passed through at least a pair of rotating needle blade rolls for splitting to obtain net-like structure. For splitting, an equipment described, for example, in JP-A-180621/1983 can be employed.

This equipment described in JP-A-180621/1983 has a pair of needle blade rolls. The present invention can be also executed by using one needle blade roll as described in JP-B-1371/1977, but the splitting conditions are limited. For example, in case where the splitting is conducted from one side of the stretched film with one needle blade roll, when the number of needles of the needle blade roll is increased (when the split width is narrowed), the points of the needles are difficult to bore into the film and the splitting cannot be conducted particularly at the edges (ears) of the film, whereas it depends on the film thickness and stretching ratio. In this point, the film can be split uniformly up to its edges by using a pair of needle blade rolls engaged with each other. The preferred embodiment is explained in accordance with FIG. 5.

Figure 5:
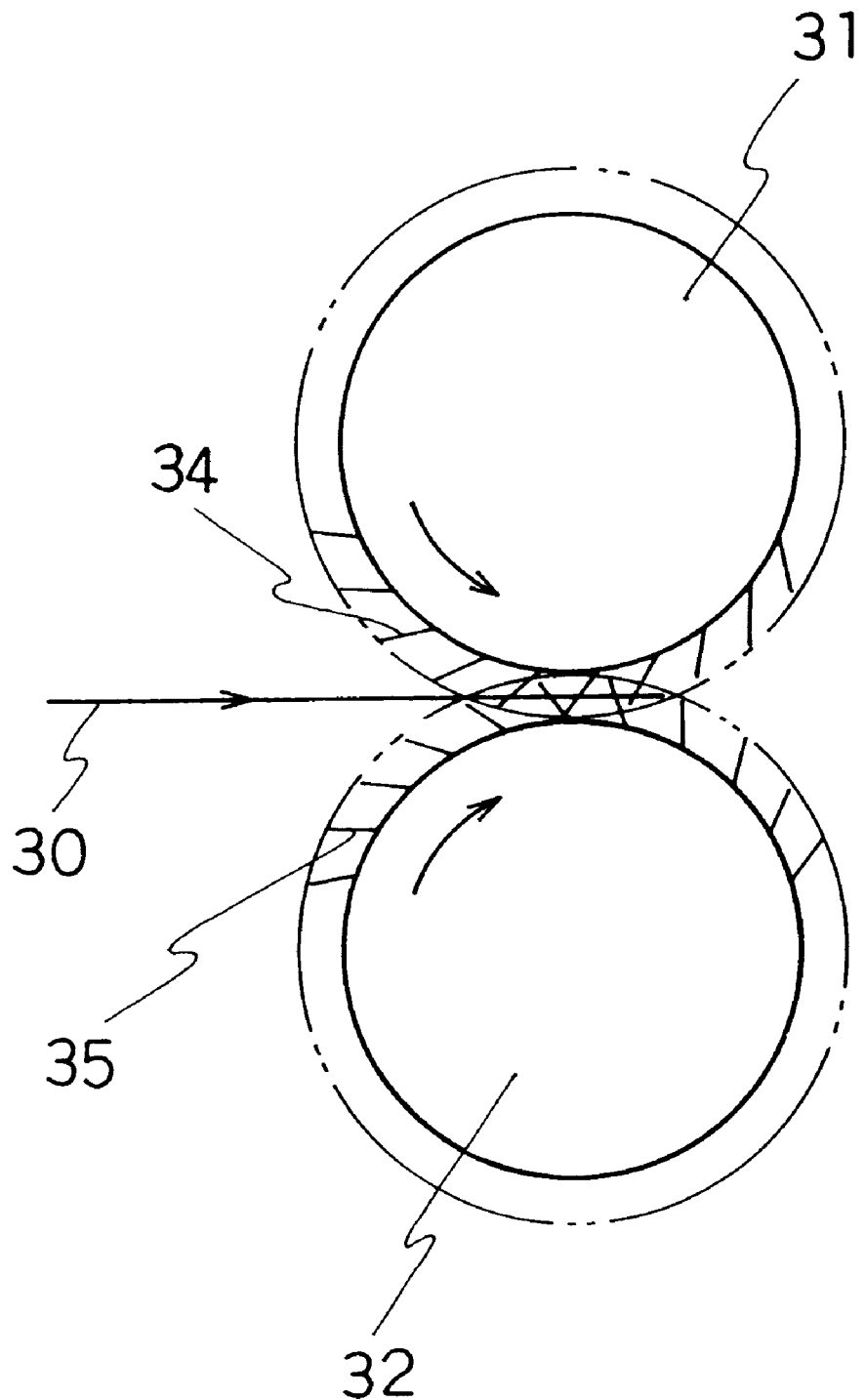
FIG. 5 is a diagrammatic sectional view of the example of an opening machine which can be used in the process for preparation of the present invention.

In FIG. 5, numeral 30 is a uniaxially stretched PTFE film, which is fed to a pair of the needle blade rolls 31 and 32 by means of a transfer means (not illustrated). At the rear side of the rolls 31 and 32, there is provided receiving means (not illustrated). The film 30 passes between the needle blade rolls 31 and 32, and during passing therebetween, the film is split with the needle blades 34 and 35 provided on the outer surfaces of the needle blade rolls 31 and 32 and is collected by the receiving means.

The rotation speed and direction of the needle blade rolls, the film feed speed and the angle of needles can be optionally selected, and in the present invention, it is preferable that the film feeding direction is the same as the rotation direction of the roll.

It is preferable that the relation of the uniaxially stretched PTFE film feed speed (v1) and the needle blade roll rotation speed (peripheral speed (v2)) is v2>v1. In that case, the pattern of the network structure is usually a geometrical pattern (FIG. 1) made by a difference in the speed of the needle blades passing the surfaces of the film. If v2 is exceedingly higher than v1, the pattern does not become the network structure and the film is fibrillated (becoming staple fibers).

Figure 12:
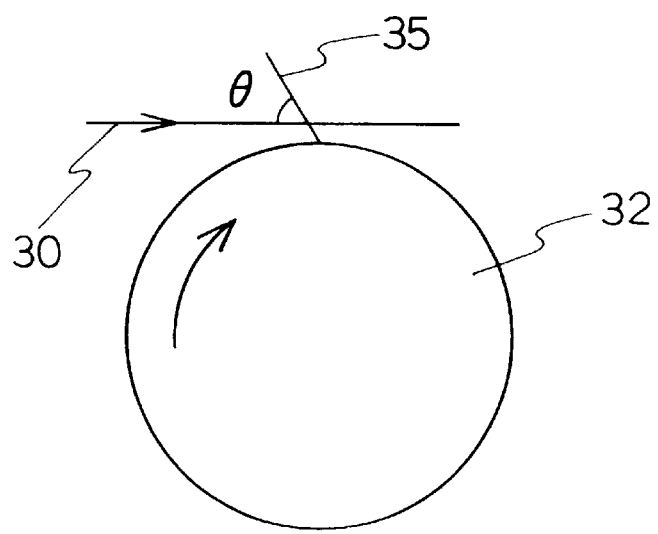
FIG. 12 is a diagrammatic sectional view explaining an angle (θ) of a needle of the needle blades of the opening machine shown in FIG. 10.

An angle (θ) of needle is preferably 45° to 90°, particularly preferably 50° to 70° to the running direction of the film as shown in FIG. 12. In FIG. 12, numerals 30, 32, and 35 are the same as above.

In FIG. 5, the arrangement, the number, the length, the diameter and the angle of needle blades 34 and 35 of the needle blade rolls 31 and 32 may be properly determined in consideration of a thickness of the fibers intended to be obtained. It is preferable that the blades are usually arranged at a row in the longitudinal direction of the roll, the number of blades is 20 to 100/cm$^2$ and the angle of needles is 50° to 70°, but the arrangement, the number and the angle are not limited thereto. Also the mounted conditions of the needle blades of the rolls 31 and 32 may be the same or different. The distance between the needle blade rolls 31 and 32 may also be properly adjusted. The preferable distance is usually such that the needles overlap by about 1 to 5 mm at the end thereof.

The thus obtained uniaxially stretched PTFE split films having a network structure become split yarns of the present invention as they are or by forming those split films into a cord.

The split yarn of the present invention is excellent in flexibility and bulkiness because it is uniaxially stretched and split into a network structure. Fineness (denier) of the split yarn of the present invention is defined by a film width, and selected optionally depending on applications. The split yarn of the present invention can be used as it is as a cord having chemical resistance, heat resistance and dielectric strength, and can be formed into a fabric or a knitted (braided) cord by weaving or knitting. The obtained fabric and knitted cord are useful as heat resistant and chemical resistant materials for heat insulation, and materials for filter cloth for dust collection, heat resistive cloth, gland packing, filter cloth for fluid, filter guard, pump packing, sliding member, sealing material, dental floss and the like.

As mentioned above, the split yarn of the present invention is an integrated one which becomes in the form of a net when enlarged (FIG. 1). Such a split yarn (a uniaxially stretched split film having a network structure), when cut only in the longitudinal direction, becomes a bundle of filaments because crosswise lines are cut. The filaments have a number of branches or loops because the cut portions of each filament become in the form of branches or loops. The present invention further relates to those PTFE filaments having branches.

In order to cut the network structure in the longitudinal direction, the uniaxially stretched split film may be passed between the needle blades in the form of a comb.

In that case, it is preferable that the film is fed, being slightly enlarged in the transverse direction, and that the edge of the needle blade which faces the split film is sharp. The number and arrangement of needle blades may be defined depending on the number of split lines of the film (flexibility and bulkiness are enhanced by increase in the number of split lines).

In addition, the split film can be cut more by passing it through a number of comb-like blades or the needle blades provided on the same circumference and rotating at very high speed.

In any of the above-mentioned methods, in order to make a length of the branch short, it is necessary to cut the network structure sharply. If not so, long branches arise. On the contrary, in order to obtain long branches, it is better to carry out cutting mainly by tearing but not sharp cutting.

Fineness is defined nearly by a splitting width, and is usually from 2 to 200 deniers, preferably 2 to 50 deniers, more preferably 2 to 30 deniers, particularly preferably 2 to 15 deniers from the viewpoint of the feeling. It is preferable that the proportion of fibers of more than 200 deniers falls in the range of less than 10%, particularly less than 5%.

The filaments of the present invention have branches and are bulky, and can be used as heat resistant and chemical resistant materials for heat insulation, and materials for filter cloth for dust collection, heat resistive cloth, gland packing, filter cloth for fluid, filter guard, pump packing, sliding member, sealing material, dental floss and the like.

The present invention further relates to a method of producing cotton-like PTFE materials. Those cotton-like materials can be obtained by cutting the above-mentioned split yarn to a given length and then opening or by cutting the above-mentioned filament to a given length and then opening.

The split yarn can be cut, for example, by press-cutting with a cutter roller and anvil roller which are used for tow spinning or by cutting with a cutter such as a shearing press. A cut length is from 25 to 200 mm, preferably from 37.5 to 150 mm. When the cut length is too short, a percentage of dropped fibers of the obtained cotton-like materials increases and intermingling property becomes worse. When too long, there occurs an obstruction to processability of the cotton-like materials, for example, uniform dividing into webs. The split yarn is, after the cutting, opened by an opening machine or a carding machine to be formed into cotton-like materials.

The filaments can be cut, for example, by press-cutting with a cutter roller and anvil roller which are used for tow spinning or by cutting with a cutter such as a shearing press in the same manner as in the cutting of the split yarn. A cut length is from 25 to 200 mm, preferably from 37.5 to 150 mm. When the cut length is too short, a percentage of dropped fibers of the obtained cotton-like materials increases and intermingling property becomes worse. When too long, there occurs an obstruction to processability of the cotton-like materials, for example, uniform dividing into webs. The PTFE fiber is, after the cutting, opened by an opening machine or a carding machine to be formed into cotton-like materials.

Appearance of the obtained cotton-like PTFE materials are like cotton.

The cut split yarns or filaments which are subjected to opening are not necessarily those having the same length. Those having various lengths within the above-mentioned range may be mixed with each other.

Also it is particularly preferable that the fibers making the cotton-like PTFE materials of the present invention have a branched structure, fineness thereof is 2 to 200 deniers, preferably 2 to 50 deniers, more preferably 2 to 30 deniers, particularly 2 to 15 deniers, the number of crimps is 1 to 15 per 20 mm, and the figure of section of the fibers is not uniform.

Figure 7:
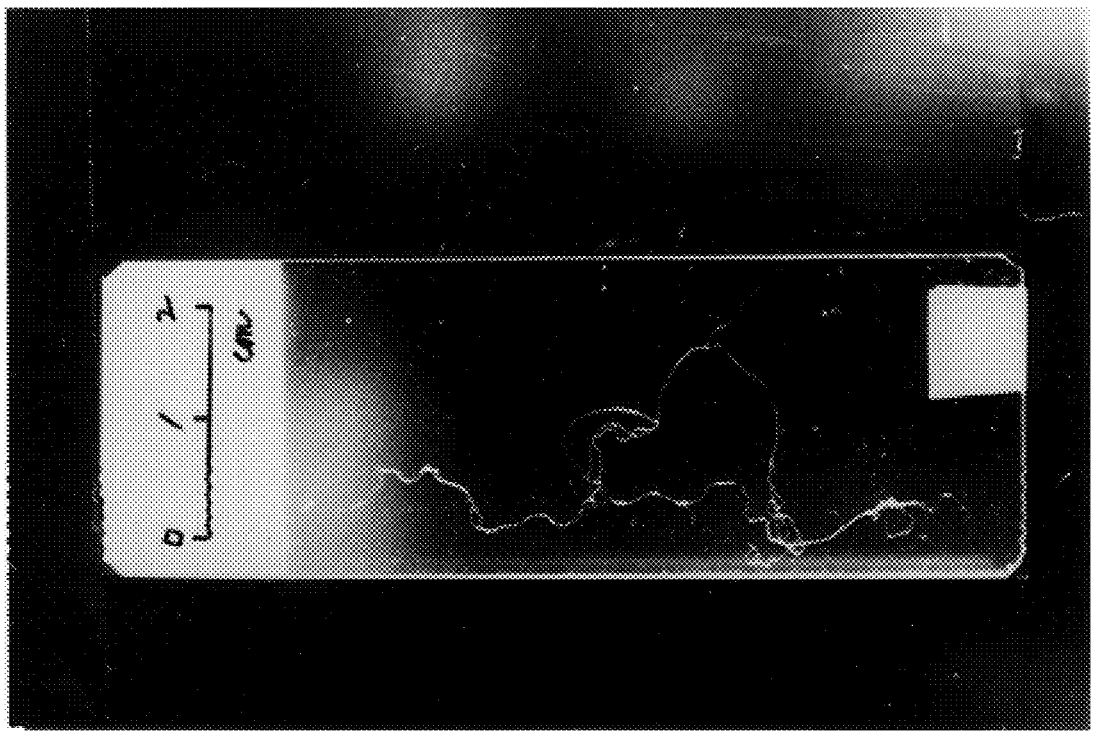
FIG. 7 is a photograph (×1.5) showing a shape of the fiber prepared in Example 21 of the present invention.
Figure 8:
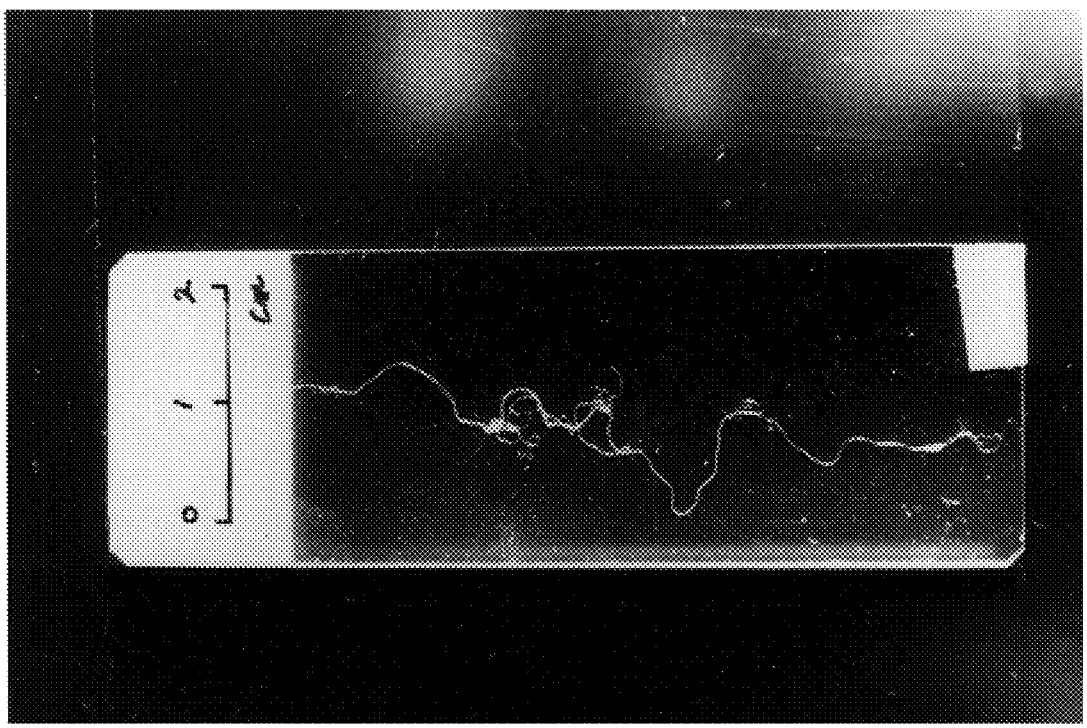
FIG. 8 is a photograph (×1.5) showing a shape of the fiber obtained in Example 21 of the present invention.
Figure 9:
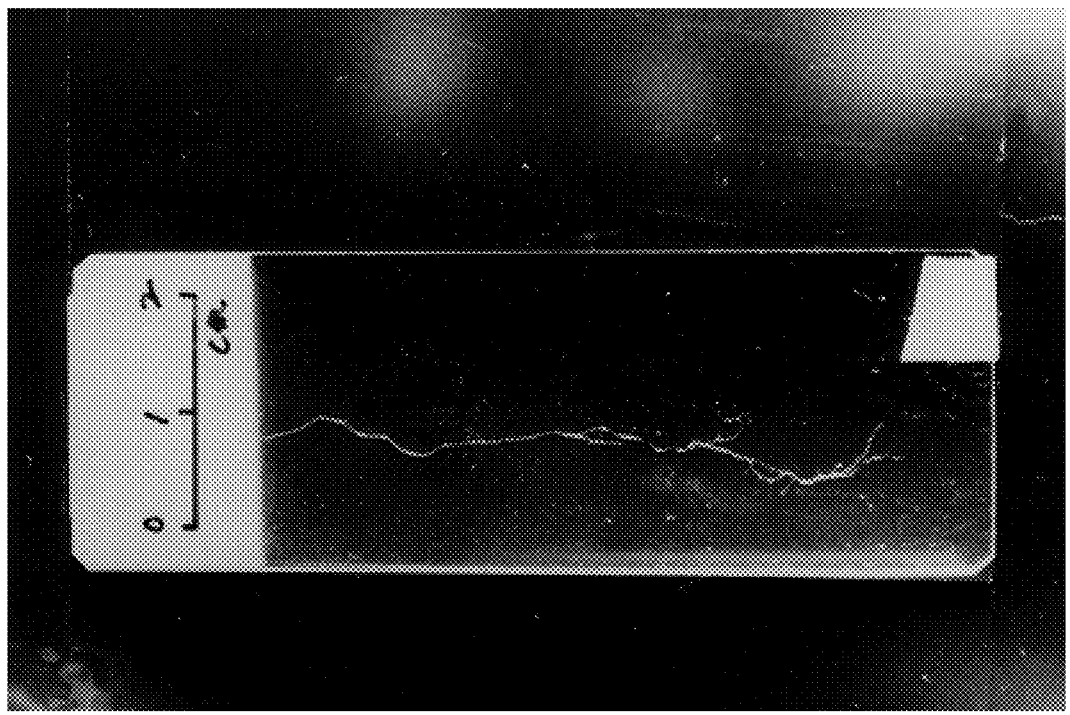
FIG. 9 is a photograph (×1.5) showing a shape of the fiber obtained in Example 21 of the present invention.

The branched structure can be illustrated as shown in FIG. 6. The branched structure FIG. 6(*a*) shows a fiber 1 and a plurality of branches 2 coming from the fiber 1. FIG. 6(*b*) shows a fiber having a branch 2 and further a branch 3 coming from the branch 2. FIG. 6(*c*) shows a fiber simply divided into two branches. FIG. 6(*d*) shows a fiber having a loop 5. Those structures are only models of the fibers, and the fibers having the same structure are not found actually (FIGS. 7 to 9). This is one of important features of the present invention. The number and the length of branches are not particularly limited, but the existence of such branches and loops is an important cause of enhancing intermingling property of the fibers. It is preferable that there is at least one branch or loop, particularly at least two branches or loops per 5 cm of the fiber.

The fineness ranges from 2 to 200 deniers, preferably 2 to 50 deniers, more preferably 2 to 30 deniers, particularly 2 to 15 deniers. As it can be seen from FIGS. 7 to 9 referred to hereinafter, the preferable cotton-like materials are obtained when the fineness of the fiber including branches is in the said range, though there is no fiber having the same fineness throughout the fiber. Therefore there is a case where a part of the fiber is out of the fineness of the above-mentioned range. Also in the cotton-like materials of the present invention in order not to make intermingling property worse, it is preferable that the content of the fibers having a fineness of more than 200 deniers is minimized below 10%, particularly below 5%.

Also it is preferable that as shown in FIG. 6(*a*), the fiber 1 making the cotton-like materials of the present invention has partly a "crimp" 4. The "crimp" also contributes to enhancement of intermingling property. The preferable number of crimps is 1 to 15 per 20 mm. According to the process of production of the present invention, there occurs crimps even if no specific crimping process is applied.

The cross sectional figure of the fiber is irregular because of splitting by a mechanical force, and this contributes to intermingling among the fibers.

The cotton-like PTFE materials of the present invention, being excellent in intermingling property, is suitable for spun yarn, non-woven fabrics and filter cloth for dust collection.

The non-woven fabrics are produced by means of a needle punching machine, and then water jet needle machine after treating with a carding machine, but the prior PTFE fibers having a low friction coefficient and a large specific gravity, could not be treated in the same manner as the other polyolefin.

Figure 10:
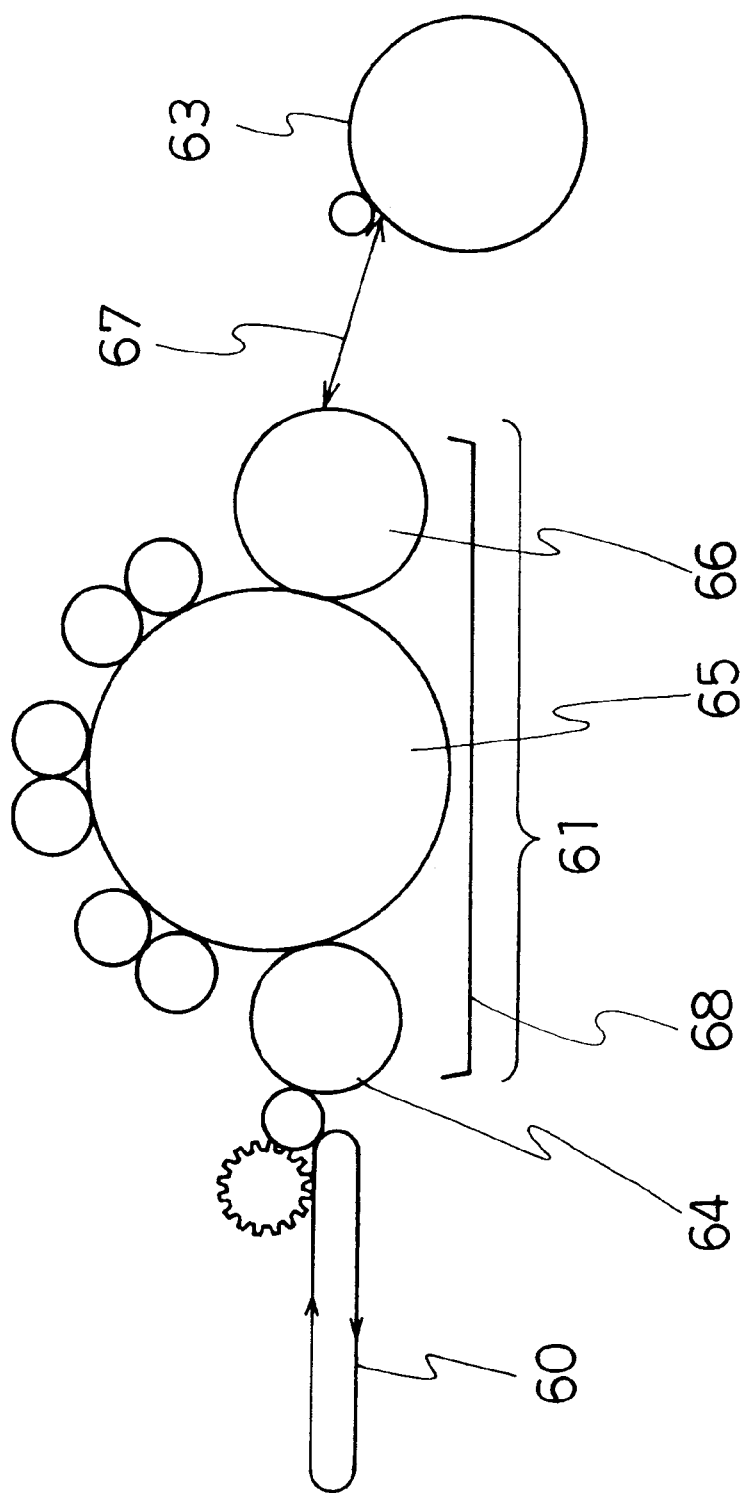
FIG. 10 is a diagrammatic sectional view of a hitherto known carding machine, which can be used for preparing a non-woven fabric from the cotton-like materials of the present invention.

For instance, in case of producing non-woven fabrics with a carding machine as shown in FIG. 10, the cotton-like materials (not illustrated) being transferred with a fiber mass conveyor 60 are passed through a carding machine 61, become webs, and then are wound on a drum 63 from a doffer 66. The carding machine (FIG. 10) used in the present invention is employed for polyolefin fibers such as polypropylene, and the distance (referred to as a "card crossing distance") between the doffer 66 and the drum 63 is set at about 28 cm. When the prior PTFE fibers were used, there occurred a dropping of the web between the doffer and the drum in case of that distance, and unless the distance is shortened up to about 5 cm, the web could not be wound on the drum.

When the cotton-like PTFE materials of the present invention are used, the web can be wound on the drum without any problem with the same card crossing distance (about 28 cm) as that of the cotton-like polyolefin materials.

In FIG. 10, numeral 64 indicates a taker-in-roller, numeral 65 indicates a cylinder, numeral 66 indicates a doffer, and numeral 67 indicates a card crossing distance.

The filter cloth for dust collection of the present invention is obtained from cotton-like materials produced by the method of the present invention, and is suitable, for example, for a bag filter for dust collection which requires heat resistance and chemical resistance.

The above-mentioned filter cloth for dust collection is produced by the method of, for example, spraying an antistatic agent to the cotton-like materials obtained through the above-mentioned method, with a sprayer or the like and passing the materials through the carding machine shown in FIG. 10 to make a web.

Then the obtained web is placed on one surface and/or both surfaces of a base fabric produced from, for example, meta-linked type aramid fiber, para-linked type aramid fiber, PTFE fiber, polyimide fiber, glass fiber, poly(phenylene sulfide) fiber, polyester fiber and the like, and then for intermingling of the fibers, a needle punch, water jet needle or the like is used, and thus the filter cloth for dust collection of the present invention can be obtained.

The method of the present invention for producing the filter cloth for dust collection is not limited to those mentioned above.

The present invention is explained by means of Examples, but is not limited thereto.

Physical properties and measuring methods thereof, which are used in this specification including Examples are as mentioned below.

(Fiber length and number of branches)

A hundred pieces of fibers were sampled at random and the fiber length and the number of branches (including loops) were measured.

(Shape of section)

The shape of section of the bundle of fibers sampled at random were measured with a scanning electron microscope.

(Fineness)

A hundred pieces of fibers sampled at random were used to measure the fineness thereof with an electronic fineness measuring equipment (available from Search Co., Ltd.) which utilizes a resonance of the fiber for measurement.

The equipment could measure the fineness of the fibers having the length of not less than 3 cm, and the fibers were selected irrespective of trunks or branches. But the fibers having, on the length of 3 cm, a large branch or many branches were excluded because they affects the measuring results. The equipment is capable of measuring the fineness in the range of 2 to 70 deniers, and so for the fibers having the fineness exceeding 70 deniers, the fineness thereof was obtained by a weight measurement. The fibers having the fineness less than 2 deniers were excluded because the measurement is difficult.

Fineness of fibers making a network structure was measured after the fibers were formed into staple fibers.

With respect to Example 41, fineness of 2,000 fibers selected at random was measured with an automatic fiber diameter measuring apparatus (FDA-200 available from Peyer) by irradiating the fibers with laser beams and automatically measuring the fineness by using the projection from the irradiation.

(Number of crimps)

Measurement was made in accordance with the method of JIS L 1015 by means of an automatic crimp tester available from Kabushiki Kaisha Koa Shokai with a hundred pieces of fibers sampled at random (The crimps on the branch were not measured).

(Air permeability)

Measurement was carried out with a Frazier type air permeability tester.

(Percentage of dropped fibers)

There was measured a weight percentage of fibers dropping on the cover 68 provided under the taker-in roller 64, cylinder 65 and doffer 66 when a web was passed through a carding machine (SC360-DR available from Daiwa Kiko Kabushiki Kaisha) shown in FIG. 10, on the basis of the total weight of the fibers fed.

(Crossing of web)

Cotton-like materials were passed through the carding machine shown in FIG. 10 to form a web and the web crossed from the doffer 66 to the winding drum 63 to be wound on the drum. In that case, it was evaluated whether or not the web crosses the card crossing distance (about 28 cm) without dropping and is wound on the winding drum 10.

(Shrinkage)

Measurement was made with respect to 100 fibers sampled at random. One end of the fiber was fixed on a glass plate with an adhesive, and a length of the fiber ($L_1$) was measured. Then another glass plate was placed thereon to interpose the fiber between the glass plates. The fibers interposed between the glass plates were held at 200° C., 250° C. and 300° C. each for 30 minutes in an electric oven and then taken out of the oven. Then the fiber length ($L_2$) was measured again, and the shrinkage was obtained by the following equation.

$$\text{Shrinkage} = \frac{L_1 - L_2}{L_1} \times 100 \ (\%)$$

(Feeling)

Evaluated with the following criteria, A, B, and C.

A: Feeling is soft and good.

B: Feeling between A and C.

C: Feeling is rigid and not good.

(Thickness)

A load of 20 g/cm² was applied by using a compressive elasticity tester (available from Nakayama Denki Sangyo Kabushiki Kaisha). Measurement was carried out at 10 points at random and an average of them was employed.

(Collection efficiency)

Figure 13:
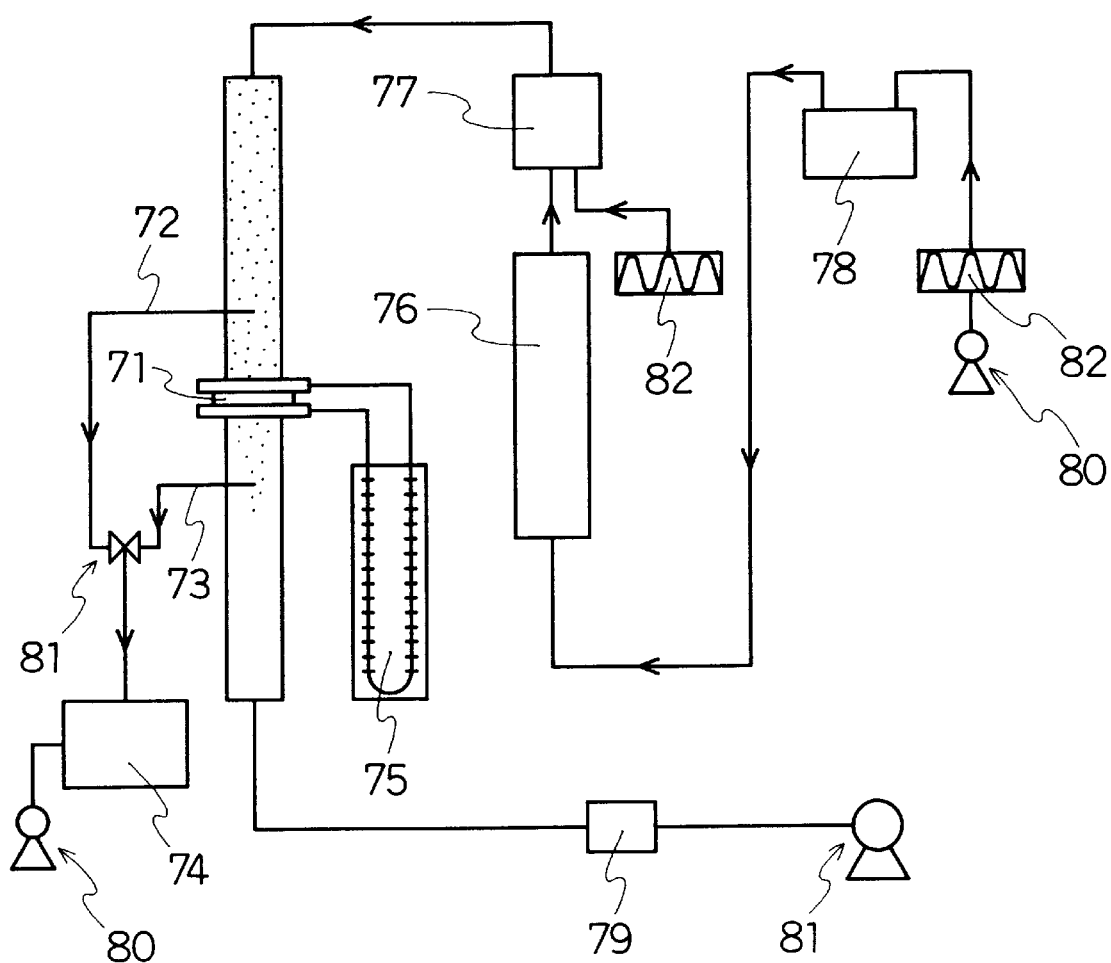
FIG. 13 is an explanatory view of an apparatus for measuring collection efficiency in Example 41 and Comparative Example 4.

FIG. 13 is a view illustrating a measuring apparatus for collection efficiency.

In FIG. 13, numeral 71 indicates a filter cloth for dust collection, which was obtained in Example 41 or Comparative Example 4 (measuring area: 50 mm φ), numeral 72 indicates a nozzle for measuring an upstream concentration, numeral 73 indicates a nozzle for measuring a downstream concentration, numeral 74 indicates a dust counter, numeral 75 indicates a manometer, numeral 76 indicates a diffusion dryer (silica gel), numeral 77 indicates a particle diffusion box, numeral 78 indicates an ultrasonic particle generator, numeral 79 indicates a flow meter, numeral 80 indicates a pump, numeral 81 indicates a blower, numeral 82 indicates a HEPA filter and numeral 83 indicates a cock.

The dust collection efficiency when the non-woven fabrics obtained in Example 41 and Comparative Example 4 were used as the filter cloth for dust collection was measured with the above-mentioned apparatus under the following conditions.

Filtration rate: 3.3 cm/sec.

Particles generated: Particles generated from an aqueous solution of 1% by weight of rhodamine B ($C_{28}H_{31}O_3N_2Cl$, available from Wako Junyaku Kogyo Kabushiki Kaisha, Molecular weight: 479.03)

Upstream concentration: $5.5 \times 10^2$ particles/cc

EXAMPLE 1

(1) The PTFE fine powder (Polyflon F104U available from Daikin Industries, Ltd.) was mixed with a lubricant (IP-2028, available from Idemitsu Sekiyu Kagaku Kabushiki Kaisha), and then aging was done at room temperature for 2 days and a compression preforming was conducted to give a block. The preformed article in the form of a block was paste-extruded and calendered, and then the lubricant was heated and dried to make an unsintered film.

(2) The unsintered film was heat-treated for 60 seconds in a salt bath heated to 360° C., and the sintered film having a width of 160 mm and a thickness of 60 μm was obtained.

(3) The sintered film was stretched by 4 times in the longitudinal direction by means of two rolls heated to 320° C. and having different rotation speeds, and thus the uniaxially stretched film of 87 mm wide by 23 μm thick was obtained. The film was then slit to a width of 10 mm.

(4) The obtained uniaxially stretched slit film was split by means of a pair of upper and lower needle blade rolls shown in FIG. 5 at the film feed speed (v1) of 5 m/min and the peripheral speed (v2) of the needle blade roll of 25 m/min, that is, a v2/v1 speed ratio of 5 times.

Figure 11:
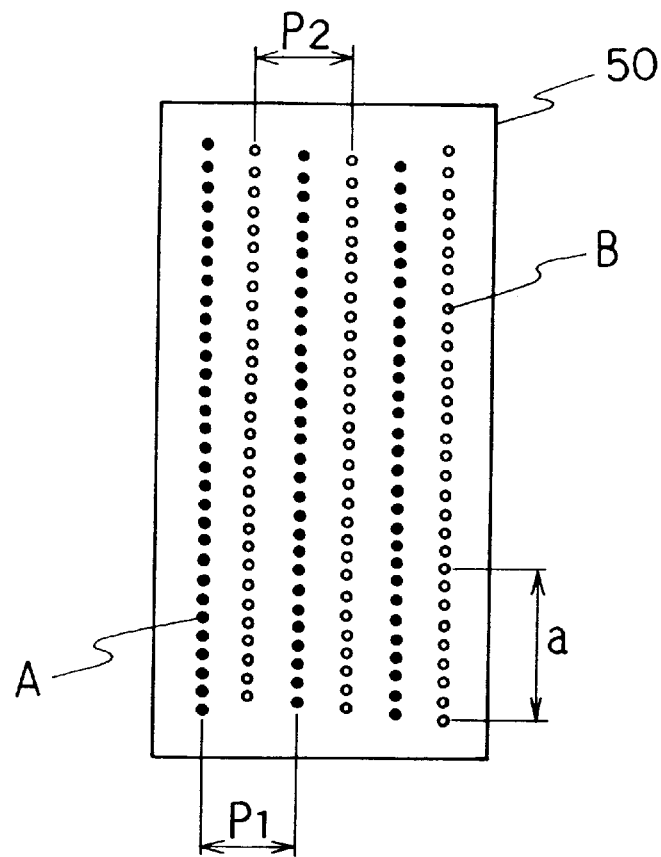
FIG. 11 is an explanatory view showing an example of arrangement of needle blades on the roll surface of the opening machine shown in FIG. 10.

The shape of the needle blade rolls, and the arrangement and engagement of the blades of the upper and lower needle blade rolls are as mentioned below. When the film 30 was passed at the same speed as a rotation of a pair of upper and lower needle blade rolls 31 and 32 of FIG. 5, the punched film as shown in FIG. 11 was obtained. In FIG. 11, A is a needled hole of the upper needle blade roll 31, and the pitch P1 of the holes in the circumferential direction was 2.5 mm. B is a needled hole of the lower needle blade roll 32, and the pitch P2 thereof was 2.5 mm just like P1. The number "a" of needles in the longitudinal direction of the roll was 13 per 1 cm. Also as shown in FIG. 12, the angle (θ) of the needle to the film 30 being fed between the rolls 31 and 32 was so set as to be an acute angle (60°). As it is seen from FIG. 11, the upper and lower needle blade rolls 31 and 32 were so set that the needles of the upper and lower rolls were arranged alternately in the circumferential direction of the rolls. The length of the needle blade rolls was 250 mm, and the diameter of the rolls was 50 mm at the ends thereof.

Operating conditions of the above-mentioned steps (2), (3) and (4) are shown in Table 1.

(5) Fineness of the obtained split yarn was about 4,200 deniers, and its tensile strength was measured with an Auto Graph (DSC-500 available from Shimadzu Corporation). The results are shown in Table 2.

(6) The split yarn was twisted with a twist tester at the number of twists of 5 per 25 mm to obtain a bulky split twist yarn.

EXAMPLES 2 TO 4

PTFE split yarns were obtained in the same manner as in Example 1 except that the processes (2) to (4) of Example 1 were changed as shown in Table 1. Fineness and tensile strength of each split yarn were measured in the same manner as in Example 1. The results are shown in Table 2. Also the split yarn was twisted in the same manner as in the step (6) of Example 1, and a twist yarn having an excellent bulkiness was obtained.

TABLE 1

| Ex. No. | Process (2) | Process (3) | Process (4) |
|---|---|---|---|
| 1 | 360° C., 60 seconds, 160 mm wide, 60 μm thick, Crystalline conversion ratio 1.0 | Slitting to 10 mm wide after stretching by 4 times at 320° C., (87 mm wide, 23 μm thick) | v1 = 5 m/min. v2 = 25 m/min. v2/v1 ratio: 5 |
| 2 | 360° C., 62 seconds, A film (158 mm wide, 90 μm thick, Crystalline conversion ratio 1.0) was slit to 20 mm.* | Heat treating at 340° C. for 30 seconds after stretching by 5 times at 320° C. 11 mm wide, 44 μm thick | v1 = 5 m/min. v2 = 25 m/min. v2/v1 ratio: 5 |
| 3 | 337° C., 54 seconds, 160 mm wide, thick, Crystalline conversion ratio 0.38 | Slitting to 10 mm 125 μm wide after stretching by 15 times at 300° C. (106 mm wide, 30 μm thick) | v1 = 5 m/min. v2 = 7.5 m/min. v2/v1 ratio: 1.5 |
| 4 | 337° C., 48 seconds, 159 mm wide, 125 μm thick, Crystalline conversion ratio 0.33 | Heat treating at 360° C. for 1 minute after stretching by 15 times at 300° C., (81 mm wide, 18 μm thick) Then slitting to 10 mm wide | v1 = 5 m/min. v2 = 25 m/min. v2/v1 ratio: 5 |

*In Example 2, slitting is carried out in the Process (2).

TABLE 2

|  | Denier | Tensile strength (g/d) |
|---|---|---|
| Example 1 | about 4,200 | 0.9 |
| Example 2 | about 8,500 | 0.9 |
| Example 3 | about 2,200 | 0.8 |
| Example 4 | about 3,000 | 1.2 |

EXAMPLES 5 TO 11

(1) The films obtained by the steps (1) to (3) of Example 2 were split by using the same needle blade rolls as in Example 1 and changing the film feed speed (v1) and the peripheral speed of the needle blade rolls (v2) as shown in Table 3 to give split yarns. The obtained split yarns had a network structure. Fineness (denier) of fibers forming the network structure and the feeling of the split yarns are shown in Table 3.

TABLE 3

| Ex. No. | Speed ratio (v2/v1) (Peripheral speed of needle blade roll/Film feed speed) | Fineness of fibers making a network structure (Denier) | Feeling |
|---|---|---|---|
| 5 | 1.5 (34.5/23) | 19.8 | C |
| 6 | 3 (69/23) | 14.5 | B |
| 7 | 5 (25/5) | 12.1 | A |
| 8 | 10 (16/1.6) | 10.4 | A |
| 9 | 15 (24/1.6) | 8.3 | A |
| 10 | 20 (32/1.6) | 6.7 | A |
| 11 | 25 (40/1.6) | 6.1 | A |

(v1, v2: m/min)

EXAMPLES 12 TO 18

The split yarns obtained in Examples 5 to 11 were passed two times through 0.5 mm wide blades arranged like a comb at intervals of 2 mm to cut the network, and thus PTFE filaments having branches were obtained. Fineness and feeling of the filaments were measured. The results are shown in Table 4.

TABLE 4

| Ex. No. | Speed ratio (v2/v1) (Peripheral speed of needle blade roll/Film feed speed) | Fineness of fibers (Denier) | Feeling |
|---|---|---|---|
| 12 | 1.5 (34.5/23) | 20.7 | C |
| 13 | 3 (69/23) | 15.3 | B |
| 14 | 5 (25/5) | 11.7 | A |
| 15 | 10 (16/1.6) | 10.8 | A |
| 16 | 15 (24/1.6) | 8.5 | A |
| 17 | 20 (32/1.6) | 6.7 | A |
| 18 | 25 (40/1.6) | 5.9 | A |

(v1, v2: m/min)

COMPARATIVE EXAMPLE 1

A split yarn as Comparative Example was obtained in the same manner as in Example 2 except that the steps (2) to (4) were changed to those shown in Table 5 (v2/v1 ratio: 5 times). With respect to that split yarn for comparison use, the feeling of the split yarn and fineness of fibers forming the network structure were evaluated in the same manner as in Example 5. The feeling was not good (C), and the fineness was 35.7 deniers.

TABLE 5

| Process (2) | Process (3) | Process (4) |
|---|---|---|
| 360° C., 2 minutes, A film of 150 mm wide and 280 μm thick having crystalline conversion ratio of 1.0 was slit to 20 mm. | Heat treating at 340° C. for 30 seconds after stretching by 3 times at 320° C. 12 mm wide, 139 μm thick | v1 = 5 m/min. v2 = 25 m/min. v2/v1 ratio: 5 |

EXAMPLES 19 AND 20 AND COMPARATIVE EXAMPLE 2

A bundle of the split yarns obtained in Example 10 (v2/v1 ratio: 20 times) and a bundle of the filaments having branches and obtained in Example 17 were formed into twist yarns, and bulkiness thereof was evaluated by a diameter of the twist yarn. The results are shown in Table 6.

As a twist yarn for comparison use, Toyoflon type 201 (Staple fiber available from Toray Fine Chemical Kabushiki Kaisha and having crimps, Fineness: 6.7 deniers) was twisted in the same manner as above, and bulkiness of the obtained twist yarn was measured. The results are shown in Table 6.

TABLE 6

| | Twist yarn | Denier of a bundle of fibers | Bulkiness Diameter of twist yarn (μm) |
|---|---|---|---|
| Ex.19 | Split yarn of Example 10 | about 8,500 | 1,210 |
| Ex.20 | Filament of Example 17 | about 8,500 | 1,150 |
| Com. Ex.2 | Twist yarn for comparing use | about 8,500 | 920 |

EXAMPLE 21

(1) The steps (1) to (4) of Example 1 were repeated to give a split film. The splitting was carried out at a film feed speed (v1) of 5 m/mm and a peripheral speed of needle blade rolls (v2) of 30 m/min (v2/v1 ratio: 6 times).

Operating conditions are shown in Table 7.

(2) The uniaxially stretched split film was cut to 70 mm in the longitudinal direction and passed through a carding machine (Model SC360-DR available from Daiwa Kiko Kabushiki Kaisha) to give cotton-like materials comprising fibers (staple fibers) having crimping property and at least one loop and/or branch per 5 cm.

The obtained cotton-like materials contained fibers having physical properties shown in Table 8.

FIGS. 7 to 9 are photographs (×1.5) showing shapes of staple fibers contained in the obtained cotton-like materials.

EXAMPLES 22 TO 26

The same procedures as in Example 21 were repeated except that the step (1) of Example 21 was changed to one shown in Table 7, to give cotton-like PTFE materials. Physical properties of fibers contained therein were evaluated in the same manner as in Example 21. The results are shown in Table 8.

TABLE 7

| Ex. No. | Process (2) | Process (3) | Process (4) |
|---|---|---|---|
| 21 | 360° C., 60 seconds, 160 mm wide, 60 μm thick, Crystalline conversion ratio 1.0 | Stretching by 4 times at 320° C., 87 mm wide, 23 μm thick | v1 = 5 m/min. v2 = 30 m/min. v2/v1 ratio: 6 |
| 22 | 337° C., 54 seconds, 160 mm wide, 125 μm thick, Crystalline conversion ratio 0.38 | Stretching by 15 times at 300° C., 106 mm wide, 30 μm thick | v1 = 80 m/min. v2 = 120 m/min. v2/v1 ratio: 1.5 |
| 23 | 337° C., 43 seconds, 161 mm wide, 125 μm thick, Crystalline conversion ratio 0.31 | Heat treating at 320° C. for 10 seconds after stretching by 15 times at 300° C. 109 mm wide, 26 μm thick | v1 = 80 m/min. v2 = 200 m/min. v2/v1 ratio: 2.5 |
| 24 | 337° C., 49 seconds, 157 mm wide, 125 μm thick, Crystalline conversion ratio 0.34 | Heat treating at 340° C. for 30 seconds after stretching by 15 times at 300° C. 88 mm wide, 22 μm thick | v1 = 80 m/min. v2 = 240 m/min. v2/v1 ratio: 3.0 |
| 25 | 337° C., 48 seconds, 159 mm wide, 125 μm thick, Crystalline conversion ratio | Heat treating at 360° C. for 1 minute after stretching by 15 times at 300° C., | v1 = 80 m/min. v2 = 320 m/min. v2/v1 ratio: 4.0 |

TABLE 7-continued

| Ex. No. | Process (2) | Process (3) | Process (4) |
|---|---|---|---|
|  | 0.33 | 81 mm wide, 18 μm thick |  |
| 26 | 360° C., 62 seconds, 158 mm wide, 90 μm thick, Crystalline conversion ratio 1.0 | Heat treating at 340° C. for 30 seconds after stretching by 5 times at 320° C. 90 mm wide, 44 μm thick | v1 = 80 m/min. v2 = 400 m/min. v2/v1 ratio: 5 |

(France)), and the smooth non-woven fabric made of strongly bonded web to base fabric could be obtained.

In that case, the nozzles of the water jet needle were so arranged that 800 nozzles having 100 μm diameter were set at intervals of 1 mm in the transverse direction and at three rows in the longitudinal direction. The ejection pressure was 40 kg/cm$^2$, 100 kg/cm$^2$ and 130 kg/cm$^2$ at the first, second and third rows, respectively.

(3) The air permeability of the non-woven fabric which was subjected to water jet needling was measured, and was 20 cm$^3$/cm$^2$/sec.

With respect to the cotton-like materials obtained in Examples 21 and 23 to 26, needle punched non-woven fabrics could be obtained in the same manner as above.

TABLE 8

| | Fiber length (mm) | | | Number of branches | Number of crimps | | |
|---|---|---|---|---|---|---|---|
| Ex. No. | Less than 55 mm (%) | 70 ± 15 mm (%) | Not less than 85 mm (%) | (per 5 cm) Not less than 1 branch/5 cm (%) | (per 20 mm) 1 to 15 crimps/20 mm (%) | Fineness (Denier) distribution | Shape of section |
| 21 | 10 | 83 | 7 | All the fibers sampled had not less than 1 branch per 5 cm | All the fibers sampled had 1 to 15 crimps per 20 mm | 2–48 | Irregular |
| 22 | 11 | 81 | 8 | | | 2–39 | Irregular |
| 23 | 10 | 80 | 10 | | | 2–42 | Irregular |
| 24 | 9 | 81 | 10 | | | 2–40 | Irregular |
| 25 | 7 | 82 | 11 | | | 2–43 | Irregular |
| 26 | 9 | 79 | 12 | | | 2–70 | Irregular |

EXAMPLE 27

(1) About 2% by weight of antistatic agent Elimina (available from Maruzen Yuka Shoji Kabushiki Kaisha) was sprayed onto the cotton-like materials obtained in Example 22, and then the materials were passed through the carding machine (SC-360DR, available from Daiwa Kiko Kabushiki Kaisha) shown in FIG. 10. Thus the web having a weight of 450 g/m$^2$ could be obtained.

At that time, the revolutions of the cylinder, doffer and drum were 180 rpm, 6 rpm and 5 rpm, respectively.

(2) The obtained web was placed on a woven fabric (a base fabric) of Cornex CO1200 (available from Teijin Ltd.), and needling was done by means of a needle punching machine (available from Daiwa Kiko Kabushiki Kaisha) with 25 needles/cm$^2$. Thus the needle-punched non-woven fabric was obtained.

(3) An air permeability of the obtained needle punched non-woven fabric was measured to be 29 cm$^3$/cm$^2$/sec.

With respect to the cotton-like materials obtained in Examples 21 and 23 to 26, needle punched non-woven fabrics could be obtained in the same manner as above.

EXAMPLE 28

(1) About 2% by weight of antistatic agent Elimina (available from Maruzen Yuka Shoji Kabushiki Kaisha) was sprayed onto the cotton-like materials obtained in Example 22, and then the materials were passed through the carding machine (SC-360DR, available from Daiwa Kiko Kabushiki Kaisha) shown in FIG. 10. Thus the web having a weight of 350 g/m$^2$ could be obtained.

At that time, the revolutions of the cylinder, doffer and drum were 180 rpm, 6 rpm and 5 rpm, respectively.

(2) The obtained web was placed on a woven fabric (a base fabric) of Cornex CO1200 (available from Teijin Ltd.), and the web was subjected to water jet needling with a water jet needle equipment (available from Perfojet Co., Ltd.

EXAMPLES 29 TO 34

(1) About 2% by weight of antistatic agent Elimina (available from Maruzen Yuka Shoji Kabushiki Kaisha) was sprayed onto the fiber obtained in Example 21 and the cotton-like materials obtained in Example 21 by cutting a film to 2.5 cm, 5.0 cm and 10.0 cm and then passing through a carding machine (FIG. 10, SC-360DR available from Daiwa Kiko Kabushiki Kaisha), and then the fiber and cotton-like materials were passed through the carding machine. Percentage of the dropped fibers and whether or not the web crossed from the doffer to the winding drum were examined.

At that time, the revolutions of the cylinder, doffer and drum were 180 rpm, 6 rpm and 5 rpm, respectively, and the distance L from the doffer to the drum was 28 cm.

The results are shown in Table 9.

The cotton-like materials obtained in Examples 22 to 26 were also examined under the same conditions. The results are shown in Table 9.

TABLE 9

| | Percentage of dropped fibers (%) | | | | Crossing of web from doffer to winding drum | | | |
|---|---|---|---|---|---|---|---|---|
| | Cut length | | | | 2.5 | 5.0 | 7.0 | 10.0 |
| Ex. No. | 2.5 cm | 5.0 cm | 7.5 cm | 10.0 cm | cm | cm | cm | cm |
| 29 | 15.6 | 3.0 | 1.7 | 1.3 | x | o | o | o |
| 30 | 14.2 | 2.7 | 1.4 | 1.1 | x | o | o | o |
| 31 | 14.9 | 2.6 | 1.4 | 1.1 | x | o | o | o |
| 32 | 15.0 | 2.8 | 1.6 | 1.2 | x | o | o | o |
| 33 | 15.0 | 2.8 | 1.7 | 1.3 | x | o | o | o |
| 34 | 15.9 | 3.2 | 1.9 | 1.5 | x | o | o | o | o: Web crossed from the doffer to the winding drum.
x: Web did not cross from the doffer to the winding drum.

COMPARATIVE EXAMPLE 3

(1) The same experiments as in Example 29 were carried out by using Toyoflon type 201 (having crimps, fiber length:

70 mm, fineness: 6.7 deniers) and type 200 (having no crimp, fiber length: 70 mm, fineness: 6.7 deniers) which were staple fibers available from Toray Fine Chemical Kabushiki Kaisha and produced by emulsion spinning.

The results are shown in Table 10.

TABLE 10

|  | Fiber length (mm) | Percentage of dropped fibers (%) | Crossing of web from doffer to winding drum |
|---|---|---|---|
| Type 200 (having no crimps) | 70 | 32.2 | x |
| Type 201 (having crimps) | 70 | 25.9 | x |

EXAMPLES 35 TO 40

(1) One end of the fiber obtained in Example 21 was fixed on a glass plate with an adhesive, and a length of the fiber ($L_1$) was measured. Then another glass plate was placed thereon, and the fibers were held at 200° C., 250° C. and 300° C. each for 30 minutes in an electric oven. Then the fiber length ($L_2$) was measured again, and the shrinkage was obtained by the equation $[(L_1-L_2)/L_1] \times 100$ (%).

The results are shown in Table 11.

With respect to the cotton-like materials obtained in Examples 22 to 26, shrinkages thereof were obtained in the same manner. The results are shown in Table 11.

TABLE 11

| Ex. No. | Shrinkage (%) | | |
|---|---|---|---|
|  | 200° C. | 250° C. | 300° C. |
| 35 | 3.7 | 11.1 | 15.0 |
| 36 | 1.5 | 19.0 | 28.2 |
| 37 | 1.3 | 15.9 | 21.1 |
| 38 | 1.1 | 2.9 | 4.9 |
| 39 | 1.0 | 2.9 | 4.7 |
| 40 | 2.0 | 6.5 | 9.8 |

EXAMPLE 41

(1) The same procedures as in Example 1 were repeated except that the processes (2) to (4) were changed as shown in Table 12, to give a PTFE split yarn.

(2) The uniaxially stretched split film was cut to 70 mm in the longitudinal direction and passed through a carding machine (Model SC360-DR available from Daiwa Kiko Kabushiki Kaisha) to give cotton-like materials comprising fibers (staple fibers) having crimping property and at least one loop and/or branch per 5 cm.

The fineness of 2,000 fibers selected at random from the obtained fibers was measured with an automatic fiber diameter measuring apparatus (FDA-200 available from Peyer) by irradiating the fibers with laser beams and automatically measuring the fineness by using the projection from the irradiation. An average fiber diameter was 29 μm.

(3) About 2% by weight of antistatic agent Elimina (available from Maruzen Yuka Shoji Kabushiki Kaisha) was sprayed onto the obtained cotton-like materials, and then the materials were passed through the carding machine shown in FIG. 10. Thus the web having a weight of 250 g/m² was obtained. At that time, the revolutions of the cylinder, doffer and drum were 180 rpm, 6 rpm and 5 rpm, respectively.

(4) The obtained web was placed on a woven fabric (assumed to be a base fabric) of Cornex CO1700 (available from Teijin Ltd.) and another web having a weight of 250 g/m² was produced in the same manner as in above (3). The obtained web was placed on another surface of the base fabric, followed by needle punching with 750 needles/cm² by using a needle punching machine (available from Daiwa Kiko Kabushiki Kaisha) to give a needle-punched non-woven fabric.

Operating conditions of the above-mentioned steps (2), (3) and (4) are shown in Table 12.

(5) A thickness and air permeability of the obtained needle-punched non-woven fabric were measured, and the results are shown in Table 13.

Figure 14:
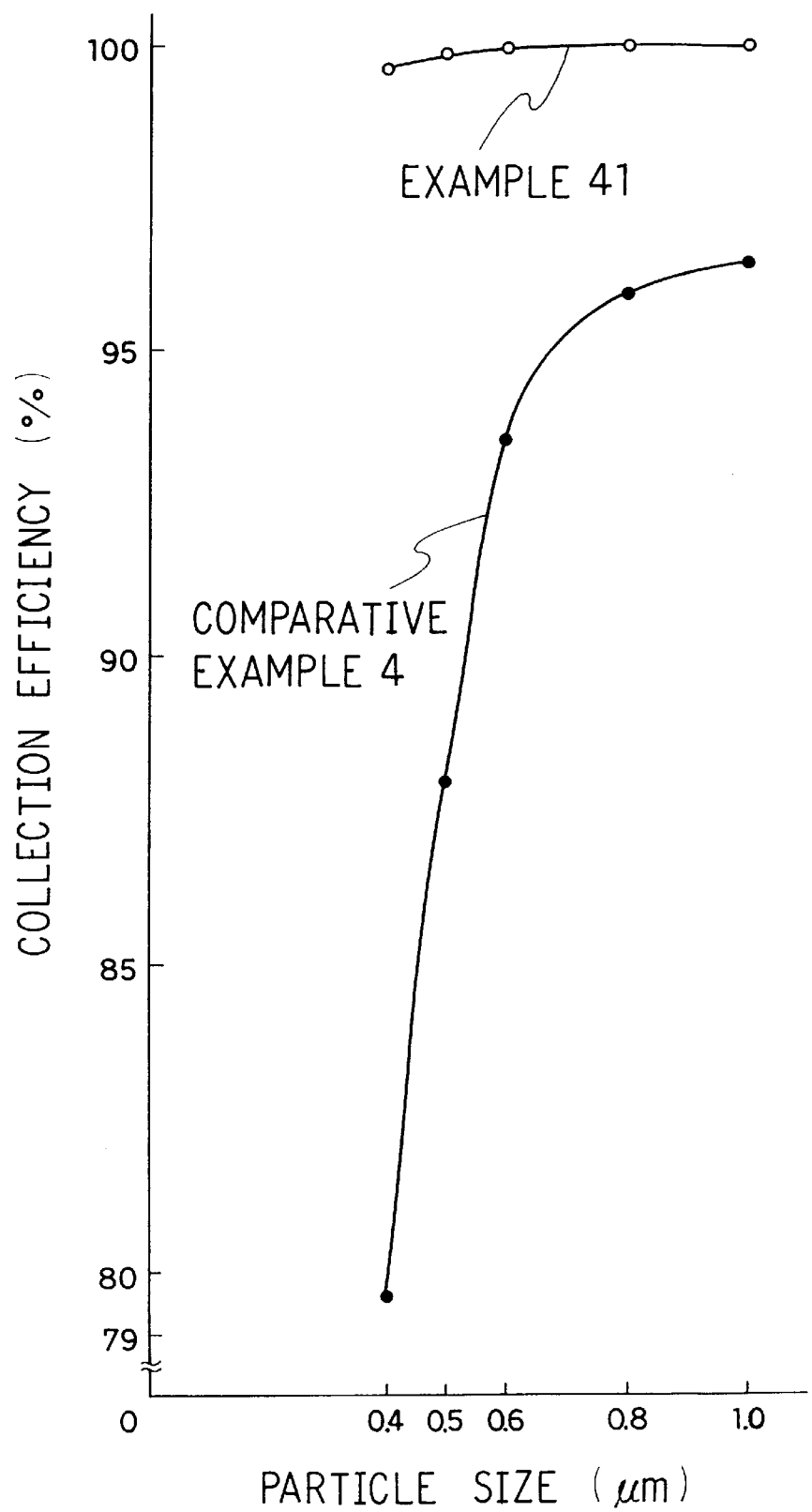
FIG. 14 is a graph showing relation between the collection efficiency and the particle size which were measured in Example 41 and Comparative Example 4.

Collection efficiency measured with an apparatus shown in FIG. 13 is shown in Table 14 and FIG. 14.

TABLE 12

| Ex. No. | Process (2) | Process (3) | Process (4) |
|---|---|---|---|
| 41 | 360° C., 40 seconds, 160 mm wide, 60 μm thick, Crystalline conversion ratio 1.0 | Stretching by 4 times at 340° C., 113 mm wide, 18 μm thick | v1 = 8 m/min. v2 = 64 m/min. v2/v1 ratio: 8 |

COMPARATIVE EXAMPLE 4

The same measurement as in Example 41 was carried out by using a non-woven PTFE fabric (Both of a web and a base fabric were made of PTFE) (B7800 available from Ichikawa Keori Kabushiki Kaisha) obtained from PTFE fibers through emulsion spinning. The results are shown in Tables 13 and 14 and FIG. 14.

As it is seen from the above-mentioned results, the filter cloth for dust collection which has excellent collection efficiency can be produced by using cotton-like PTFE materials of the present invention.

TABLE 13

|  | Weight (g/m²) | | | Number of needles (per cm²) | Thickness (mm) | Air permeability (cc/cm²/sec) |
|---|---|---|---|---|---|---|
|  | Web | Base fabric | Total | | | |
| Ex.41 | 500 | 110 | 610 | 750 | 1.78 | 34.3 |
| Com Ex.4 | 500 | 300 | 800 | — | 1.38 | 24.82 |

TABLE 14

|  | Collection efficiency (%) | | | | |
|---|---|---|---|---|---|
|  | 0.4 μm | 0.5 μm | 0.6 μm | 0.8 μm | 1.0 μm |
| Ex.41 | 99.72 | 99.86 | 99.95 | 100 | 100 |
| Com. Ex.4 | 79.62 | 87.96 | 93.52 | 95.91 | 96.42 |

INDUSTRIAL APPLICABILITY

The present invention can provide a PTFE split yarn being bulky and excellent in the feeling and a filament having good intermingling property. Also cotton-like materials can be produced efficiently at a low percentage of dropped fibers by using such a split yarn and filament. Further the filter cloth for dust collection which is obtained from the cotton-like materials is high in collection efficiency.

What is claimed is:

1. A split yarn which has a network structure and is obtained by splitting a uniaxially stretched polytetrafluoroethylene film in the stretched direction with at least a pair of needle blade rolls.

2. The split yarn of claim 1, wherein the polytetrafluoroethylene film is a semi-sintered article.

3. The split yarn of claim 1, wherein the polytetrafluoroethylene film is a sintered article.

4. A polytetrafluoroethylene filament which has branches and is obtained by cutting the network structure of the split yarn of claim 1 in the longitudinal direction.

5. The filament of claim 4, wherein the polytetrafluoroethylene film is a semi-sintered article.

6. The filament of claim 4, wherein the polytetrafluoroethylene film is a sintered article.

7. A method of producing a split yarn having a network structure, wherein a uniaxially stretched polytetrafluoroethylene film is split in the stretched direction with at least a pair of needle blade rolls.

8. The method of claim 7, wherein the polytetrafluoroethylene film is a semi-sintered article.

9. The method of claim 7, wherein the polytetrafluoroethylene film is a sintered article.

10. The method of claim 7, wherein the number of needles of the needle blade roll is from 20 to 100 per $cm^2$.

11. The method of claim 7, wherein the uniaxially stretched film is heat-treated at a temperature of not less than the temperature at uniaxially stretching.

12. A method of producing a polytetrafluoroethylene filament having branches, wherein a uniaxially stretched polytetrafluoroethylene film is split in the stretched direction with at least a pair of needle blade rolls to give a network structure and then the network structure is cut in the longitudinal direction.

13. The method of claim 12, wherein the polytetrafluoroethylene film is a semi-sintered article.

14. The method of claim 12 wherein the polytetrafluoroethylene film is a sintered article.

15. The method of claim 12, wherein the number of needles of the needle blade rolls is from 20 to 100 per $cm^2$.

16. The method of claim 12, wherein the uniaxially stretched film is heat-treated at a temperature of not less than the temperature at uniaxially stretching.

17. The method of claim 12, wherein the network structure is passed through the blades in the form of a comb to be cut in the longitudinal direction.

18. A method of producing cotton-like polytetrafluoroethylene materials, wherein the split yarn obtained by the method of any of claim 7 is cut to a given length and then opened.

19. A method of producing cotton-like polytetrafluoroethylene materials, wherein the filament obtained by the method of any of claim 12 is cut to a given length and then opened.

20. The method of claim 18, wherein the polytetrafluoroethylene fibers providing the cotton-like materials have at least one loop structure and/or branch structure per 5 cm of a fiber length, a fineness of 2 to 200 deniers, the number of crimps of 1 to 15 per 20 mm length and irregular section.

21. A filter cloth for dust collection obtained from the cotton-like materials produced by the method of any of claim 18.

* * * * *